(12) United States Patent
Kim et al.

(10) Patent No.: US 12,038,356 B2
(45) Date of Patent: *Jul. 16, 2024

(54) VACUUM TRANSFER FOR NANO INDENTER AND SAMPLE MEASUREMENT METHOD USING THE SAME

(71) Applicant: KOREA INSTITUTE OF SCIENCE AND TECHNOLOGY, Seoul (KR)

(72) Inventors: So Hee Kim, Seoul (KR); Jihyun Hong, Seoul (KR); Jae Pyoung Ahn, Seoul (KR); Inyeong Kang, Seoul (KR); Woo Suk Baek, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 470 days.

This patent is subject to a terminal disclaimer.

(21) Appl. No.: 17/326,337

(22) Filed: May 21, 2021

(65) Prior Publication Data

US 2022/0050026 A1    Feb. 17, 2022

(30) Foreign Application Priority Data

Aug. 13, 2020   (KR) .................. 10-2020-0101573

(51) Int. Cl.
*G01N 1/00* (2006.01)
*G01N 1/28* (2006.01)
*G01N 35/00* (2006.01)

(52) U.S. Cl.
CPC ....... *G01N 1/286* (2013.01); *G01N 35/00029* (2013.01); *G01N 2035/00059* (2013.01)

(58) Field of Classification Search
CPC ............. G01N 1/286; G01N 35/00029; G01N 2035/00059
See application file for complete search history.

(56) References Cited

U.S. PATENT DOCUMENTS

| | | | |
|---|---|---|---|
| 11,127,559 B2 * | 9/2021 | Kim | ............ H01J 37/20 |
| 2021/0090847 A1 * | 3/2021 | Kim | ............ H01J 37/185 |

FOREIGN PATENT DOCUMENTS

| | | |
|---|---|---|
| JP | 6-37359 Y2 | 9/1994 |
| JP | 2008-111680 A | 5/2008 |

(Continued)

OTHER PUBLICATIONS

Brian J. Landi et al., "Carbon nanotubes for lithium ion batteries," Energy & Environmental Science, 2009, pp. 638-654, vol. 2, The Royal Society of Chemistry.

(Continued)

*Primary Examiner* — Jamel E Williams
(74) *Attorney, Agent, or Firm* — CANTOR COLBURN LLP (57) ABSTRACT

There are provided a vacuum transfer system installed in an microscope to prevent oxidation of a sample and a sample measurement method using the vacuum transfer system. The vacuum transfer system according to an embodiment is a vacuum transfer system installed in an microscope to prevent oxidation of a sample, and includes a housing having an open surface, wherein the surface has a coupling element for attaching or detaching to/from the microscope, and an inside of the housing is kept closed from outside as the housing is coupled with the microscope through the coupling element, a gas inlet through which an inert gas is introduced into the housing, a gas outlet through which an active gas in the housing exits with the introduction of the inert gas into the housing, and at least one glove formed to be connected with the inside of the housing.

13 Claims, 8 Drawing Sheets

(56) References Cited

FOREIGN PATENT DOCUMENTS

| JP | 2016-57146 A | 4/2016 |
|---|---|---|
| JP | 6653276 B2 | 2/2020 |
| KR | 10-0436320 B1 | 6/2004 |
| KR | 10-2019-0029206 A | 3/2019 |
| WO | 2019/010390 A1 | 1/2019 |

OTHER PUBLICATIONS

M. Rosa Palacin, "Recent advances in rechargeable battery materials: a chemist's perspective," Chemical Society Reviews, 2009, pp. 2565-2575, vol. 38, The Royal Society of Chemistry.

Tae-Woo Kwon et al., "The emerging era of supramolecular polymeric binders in silicon anodes," Chemical Society Reviews, 2018, pp. 2145-2164, vol. 47, The Royal Society of Chemistry.

Jianming Zheng et al., "Research Progress towards Understanding the Unique Interfaces between Concentrated Electrolytes and Electrodes for Energy Storage Applications," Advanced Science, 2017, 19 pages, vol. 4, No. 1700032.

Jiaqiang Huang et al., "Nanostructures of solid electrolyte interphases and their consequences for microsized Sn anodes in sodium ion batteries," Energy & Environmental Science, 2019, pp. 1550-1557, vol. 12, The Royal Society of Chemistry.

Yu Gu et al., "Designable ultra-smooth ultra-thin solid-electrolyte interphases of three alkali metal anodes," Nature Communications, 2018, 9 pages, vol. 9, No. 1339.

* cited by examiner

VACUUM TRANSFER FOR NANO INDENTER AND SAMPLE MEASUREMENT METHOD USING THE SAME

CROSS-REFERENCE TO RELATED APPLICATION

This application claims priority to Korean Patent Application No. 10-2020-0101573, filed on Aug. 13, 2020 and all the benefits accruing therefrom under 35 U.S.C. § 119, the contents of which in its entirety are herein incorporated by reference.

BACKGROUND

1. Field

The present disclosure relates to a vacuum transfer system (a vacuum treatment system) and a sample measurement method using the same. More particularly, the present disclosure relates to a vacuum transfer system applicable to a nano indenter and a method for measuring a sample which is unstable in air such as a high capacity negative electrode and a solid electrolyte through the vacuum transfer system.

2. Description of the Related Art

This section simply provides a description of background information about this embodiment and does not constitute the prior art.

With the advent of the fourth industrial revolution, there is an increasing demand for samples which are unstable in air such high capacity negative electrodes and solid electrolytes and correlation between the mechanical properties of electrode-electrolyte interface layer and the battery characteristics is recently rising as an important issue.

In a lithium secondary battery, electrode and electrolyte material surfaces and their interface are where transport reactions of ions and electrons occur, and to basically improve the performance, it is essential to deeply understand the electrode surface and the electrode-electrolyte interface. However, the electrode-electrolyte interface formed at low potential in the negative electrode operation range rapidly reacts with moisture and oxygen when exposed to air, which makes it difficult to understand the properties of the interface itself.

That is, it is necessary to build a vacuum transfer system to analyze nano indentation equipment essential to understand the mechanical properties of the electrode-electrolyte interface within an microscope in real time without oxidation of a sample.

SUMMARY

The present disclosure is directed to providing a vacuum transfer system for providing an environment for real-time analysis of nano indentation equipment essential to understand the mechanical properties of the electrode-electrolyte interface within a scanning microscope (SEM) without oxidation of a sample and a sample measurement method using the same.

The objectives of the present disclosure are not limited to the above-mentioned objectives, and other objectives and advantages of the present disclosure will be understood by the following description and will be apparent from the embodiments of the present disclosure. Additionally, it will be easily understood that the objectives and advantages of the present disclosure may be realized by the means set forth in the appended claims and a combination thereof.

A vacuum transfer system according to an embodiment of the present disclosure is a vacuum transfer system installed in an microscope to prevent oxidation of a sample, and includes a housing having an open surface, wherein the surface has a coupling element for attaching or detaching to/from the microscope, and an inside of the housing is kept closed from outside as the housing is coupled with the microscope through the coupling element, a gas inlet through which an inert gas is introduced into the housing, a gas outlet through which an active gas in the housing exits with the introduction of the inert gas into the housing, and at least one glove formed to be connected with the inside of the housing.

A sample measurement method using a vacuum transfer system according to an embodiment of the present disclosure is a sample measurement method using a vacuum transfer system installed in an microscope to prevent oxidation of a sample, and includes preparing the vacuum transfer system combined with the microscope, in which the sample is disposed inside, introducing an inert gas through a gas inlet of the vacuum transfer system, in which an active gas in the vacuum transfer system exits through a gas outlet of the vacuum transfer system with the introduction of the inert gas, loading the sample on the microscope using a glove of the vacuum transfer system, and measuring properties of the sample using the microscope.

Through the vacuum transfer system according to an embodiment of the present disclosure, it is possible to create a sample measurement environment free of an active gas such as oxygen, and prevent a sample to be measured for the nano indenter from rapidly reacting with moisture and oxygen when exposed to air.

In particular, with the vacuum transfer system according to an embodiment of the present disclosure, it is possible to control the relative humidity of the environment in which the sample is loaded and measured on the microscope to 1.72%. That is, with the vacuum transfer system according to an embodiment of the present disclosure, it is possible to provide a more suitable environment for analysis of an air sensitive material than the internal humidity of vacuum packaging machine used to manufacture vacuum packaged samples and common glove boxes in laboratories.

Accordingly, it is possible to analyze more accurately air sensitive samples such as electrode and electrolyte material surfaces and their interfaces in lithium secondary batteries, thereby supporting the development and performance improvement of the electrode and electrolyte materials of the lithium secondary batteries.

DETAILED DESCRIPTION

The present disclosure may include a variety of modifications and variations, and particular embodiments will be illustrated in the drawings and described in detail in the detailed description. This is not intended to limit the present disclosure to the particular embodiments, and should be understood as encompassing all modifications, equivalents or substitutes included in the spirit and technical scope of the present disclosure.

In describing the present disclosure, the terms "first", "second" and the like may be used to describe various elements, but the elements may not be limited by the terms. These terms may be used to distinguish an element from another element.

For example, a first element may be referred to as a second element, and likewise, a second element may be referred to as a first element without departing from the scope of protection of the present disclosure.

The term "and/or" may include a combination of relevant items described herein or any of the relevant items.

It will be understood that when an element is referred to as being "directly connected to" or "directly coupled to" another element, there are no intervening elements between them.

The terminology used herein is for the purpose of describing particular embodiments only and is not intended to be limiting of the present disclosure. Unless the context clearly indicates otherwise, the singular forms include the plural forms as well.

It will be further understood that the term "comprises" or "includes" when used in this specification, specifies the presence of stated features, integers, steps, operations, elements, components or groups thereof, but does not preclude the presence or addition of one or more other features, integers, steps, operations, elements, components or groups thereof.

Unless otherwise defined, all terms including technical and scientific terms used herein have the same meaning as commonly understood by those skilled in the art.

It will be further understood that terms, such as those defined in commonly used dictionaries, should be interpreted as having a meaning that is consistent with their meaning in the context of the relevant art document, and will not be interpreted in an idealized or overly formal sense unless expressly so defined herein.

Hereinafter, the preferred embodiments of the present disclosure will be described with reference to the accompanying drawings.

Figure 1:
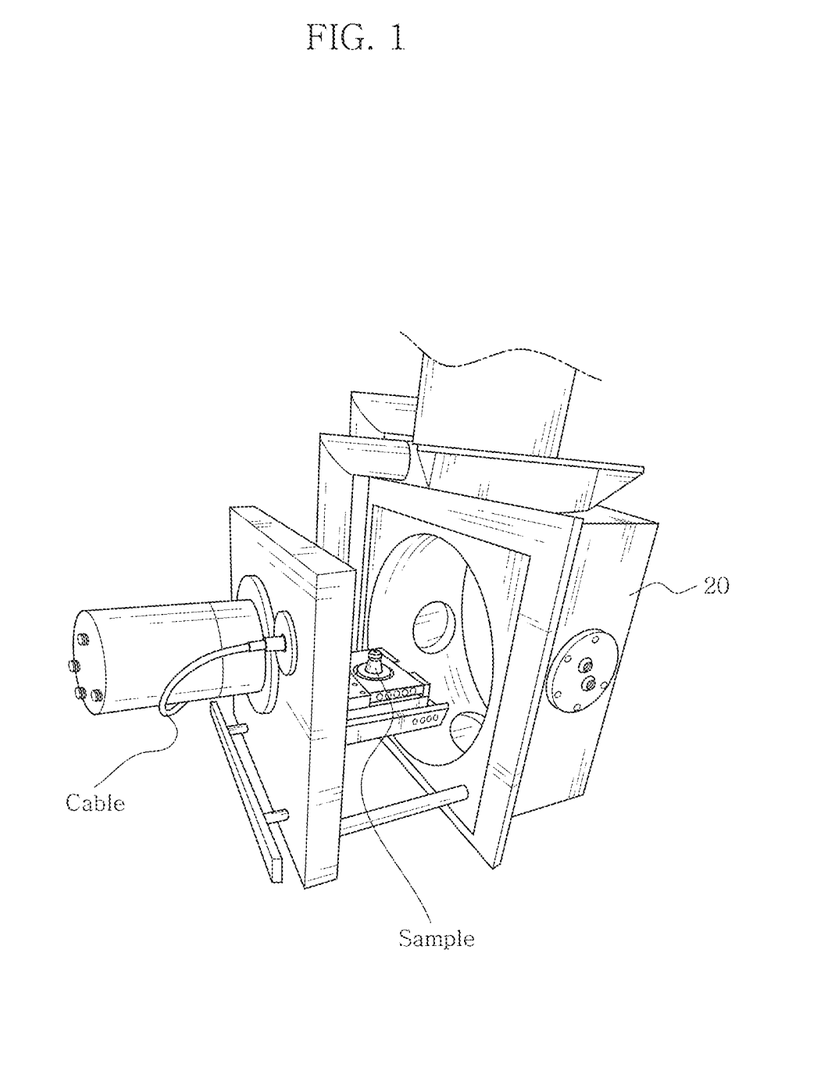
FIG. 1 shows an example of an microscope to which a vacuum transfer system of the present disclosure is applied.
Figure 2:
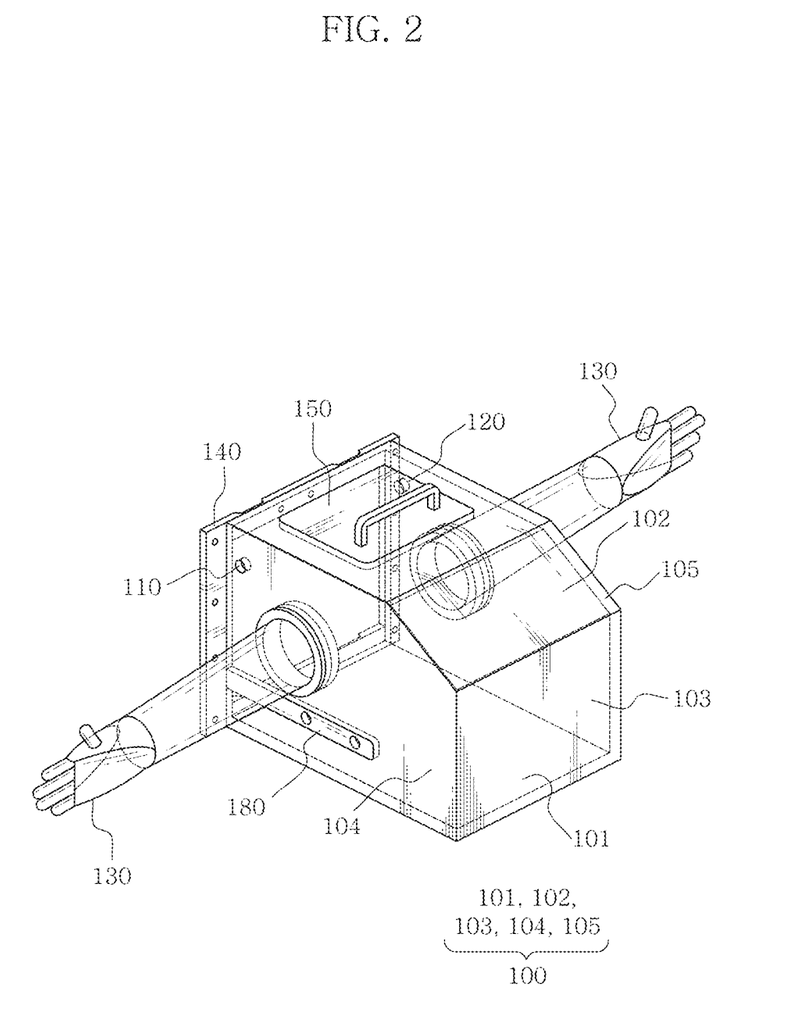
FIG. 2 shows a schematic configuration of a vacuum transfer system according to an embodiment of the present disclosure.
Figure 3:
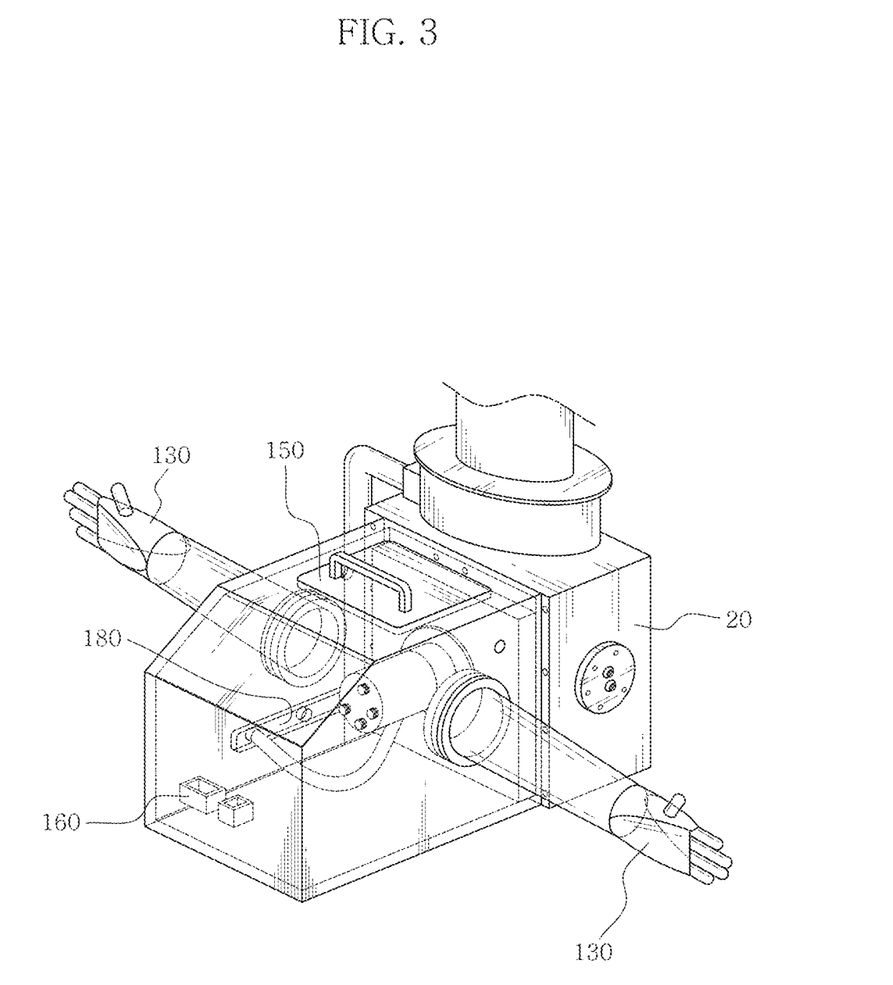
FIGS. 3 and 4 show an example of a vacuum transfer system according to an embodiment of the present disclosure when installed in an microscope.
Figure 4:
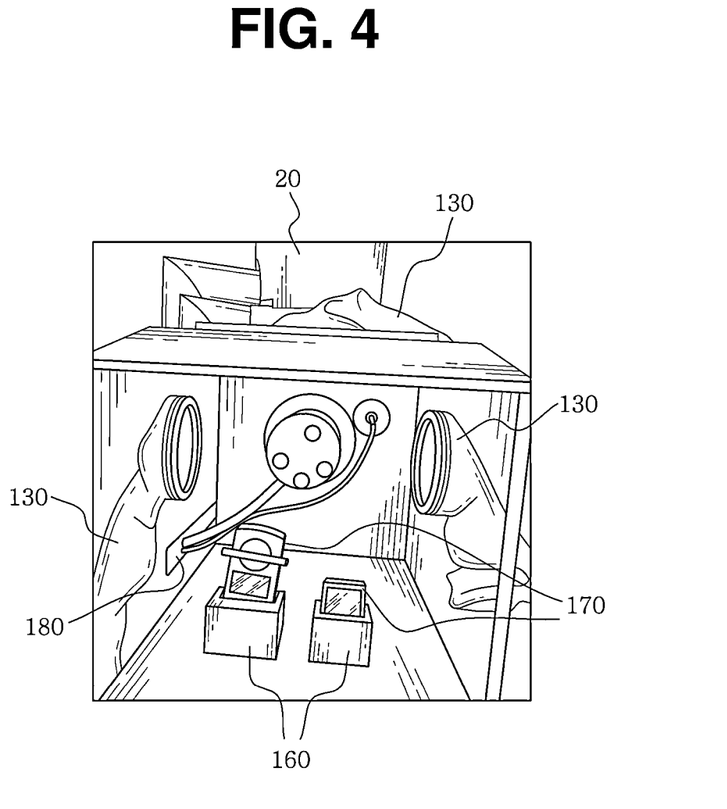

FIG. 1 shows an example of an microscope to which a vacuum transfer system of the present disclosure is applied. FIG. 2 shows a schematic configuration of the vacuum transfer system according to an embodiment of the present disclosure. FIGS. 3 and 4 show an example of the vacuum transfer system according to an embodiment of the present disclosure when installed in the microscope.

Referring to FIGS. 1 to 4, the microscope 20 may be an electron microscope, but is not limited thereto. Specifically, the microscope 20 may include a nano indenter for nano indentation. As shown in FIG. 1, a sample may be loaded on the microscope 20, and the properties of the loaded sample such as hardness and elastic modulus may be measured. Here, when combined with the microscope 20, the vacuum transfer system 10 according to an embodiment of the present disclosure may support the operation of the microscope 20 in a vacuum state free of active gas. Accordingly, since the properties of the sample may be measured in a state in which reaction with an active gas (oxygen) is prevented, it is possible to accurately measure the properties of highly oxidative samples such as interfaces between electrode and electrolyte materials applied to lithium secondary batteries.

The vacuum transfer system 10 of the present disclosure includes a housing 100, a gas inlet 110, a gas outlet 120, at least one glove 130 and a coupling element 140.

The housing 100 forms the external shape of the vacuum transfer system 10 and defines a space in which the other components are received or disposed. The housing 100 may be formed as a multi-sided solid having a plurality of sides. The plurality of sides of the housing 100 may be formed as a plate having a predetermined thickness, and when connected, may divide the internal and external spaces of the housing 100. Each side of the housing 100 may be formed as a transparent plate. Each side may be formed as a transparent acrylic plate or a glass substrate to detect the internal state of the housing 100, but is not limited thereto.

The housing 100 includes a bottom surface 101 in contact with the bottom to support the vacuum transfer system 10, a top surface 102 opposite the bottom surface 101, and a plurality of side surfaces 103, 104, 105 connecting the bottom surface 101 to the top surface 102. Here, at least one of the plurality of side surfaces is open. For example, when the plurality of side surfaces is defined as a front surface 103, a first side surface 104 and a second side surface 105, a side corresponding to a rear surface 106 corresponds to an open side having no transparent plate.

The open side of the housing 100 may allow fluid transfer between the inside and outside of the housing 100 therethrough. However, the housing 100 may be tightly connected with the microscope 20 through the open side. When the open side of the housing 100 is tightly connected with the microscope 20, the inside of the housing 100 becomes an airtight state. The fluid transfer between the inside and outside of the housing 100 may be prevented.

The coupling element 140 may be disposed on the open side of the housing 100 to connect or fix to the microscope 20. The vacuum transfer system 10 of the present disclosure may further include the coupling element 140 formed on the open side of the housing 100 to attach or detach to/from the microscope 20. The coupling element 140 may use a magnet element to easily attach and detach. Here, the magnetic element may be a flexible rubber magnet, and the size of rubber magnet may be adjusted according to the size of the microscope. The coupling element 140 may further include a sealing element to seal the coupled portion, in order to prevent fluid leaks at the coupled portion. Here, the sealing element may be a vacuum sponge, but is not limited thereto. As the sealing element is included in the coupling element 140, a vacuum state by the vacuum transfer system 10 may be maintained. However, the configuration and type of the coupling element 140 are not limited to the above-described example.

The housing 100 is configured to be attached and detached to/from the microscope 20 through the coupling element 140. When a vacuum state is required, the vacuum transfer system 10 may be attached to the microscope 20, and when a vacuum state is not required, the vacuum transfer system 10 may be detached from the microscope 20.

When the housing 100 is coupled with the microscope 20, the configuration of the microscope 20 on which the sample to be measured is loaded is disposed in the internal space of the housing 100. The housing 100 may have the internal space that is large enough to load the sample to be measured on the microscope 20 and manipulate the sample to be measured. When an active gas (oxygen, etc.) is sufficiently removed from the internal space of the housing 100, the sample may be loaded on the microscope 20 and a test may be performed on the sample.

The sample which is loaded on the microscope 20 may be disposed in the housing 100 before the housing 100 is coupled with the microscope 20. However, the present disclosure is not limited thereto, and the sample which is loaded on the microscope 20 may be disposed in the housing 100 through a sample entry door 150 formed in the housing 100 after the housing 100 is coupled with the microscope 20. That is, the vacuum transfer system 10 of the present disclosure may further include the sample entry door 150 formed in the housing 100 to allow the sample to enter the housing 100. As shown in FIG. 2, the top surface 102 of the housing 100 may include two bent surfaces to easily observe the inside of the housing 100, and one of the two surfaces may have the sample entry door 150. However, this is provided by way of illustration, and the location and shape of the sample entry door 150 is not limited thereto. Here, until an inert gas is introduced through the gas inlet 110, the sample may be kept in a vacuum packaged state. After the inert gas as described below is introduced and the inside of the housing 100 is sufficiently replaced with the inert gas, namely, the inside of the housing 100 becomes a vacuum state, the vacuum packaged sample may be unpackaged.

The gas inlet 110 and the gas outlet 120 may be disposed in the opposite surfaces of the housing 100 respectively. Referring to FIG. 2, the gas inlet 110 may be disposed in the first side surface 104 of the housing 100, and the gas outlet 120 may be disposed in the second side surface 105 of the housing 100. The gas inlet 10 or the gas outlet 20 may be generally formed in the shape of an air injection cap used as an air injection port in a tube, to make it easy to open and close and allow reuse. The air injection cap is opened, a hose is connected to the cap, gas is injected, and after gas is injected, the cap is closed to shut off oxygen, thereby preventing oxidation of the sample.

When the housing 100 is coupled with the microscope 20, the inert gas is introduced into the housing 100 through the gas inlet 110. A gas entry pipe through which the inert gas enters may be connected to the gas inlet 110, and the inert gas may be introduced into the housing 100 through the gas entry pipe.

The active gas (oxygen) inside the housing 100 exits the housing 100 through the gas outlet 120. A gas exit pipe may be connected to the gas outlet 120, and the active gas inside the housing 100 may exit the housing 100 through the gas exit pipe.

The inside of the housing 100 is replaced with the inert gas. The gas injected through the gas inlet 110 may include an argon (Ar) gas, but is not limited thereto. After air in the housing 100 is completely replaced with the inert gas, the gas inlet and the gas outlet may be blocked to maintain the current state. The vacuum transfer of the present disclosure may refer to replacing the active gas with the inert gas, and a state in which the active gas is replaced with the inert gas may be defined as a vacuum state.

The glove 130 may be formed on one surface of the housing 100 to allow an operator to put his/her hand in the housing 100 fully filled with the inert gas to perform a task. That is, one surface of the housing 100 may include an open area, and the glove 130 may be disposed to cover the open area.

The glove 130 may provide a means for allowing the operator to hold the sample outside in order to handle the sample in the sealed housing 100. For example, the glove 130 may have a hand shape. The operator may put the hand in the glove 130, unpackage the vacuum packaging of the sample, and load the sample on the microscope 20. A plurality of gloves 130 may be formed to allow the operator to put his/her two hands. The plurality of gloves 130 may be disposed corresponding to each surface of the housing 100, but is not limited thereto. As shown in FIGS. 2 and 3, two gloves 130 may be each disposed on the first side surface 104 and the second side surface 105 of the housing 100, but the number and location of the glove 130 is not limited thereto. As shown in FIG. 4, three gloves 130 may be formed, and each may be disposed on the first side surface 104, the second side surface 105 and the top surface 102. In another embodiment, the plurality of gloves 130 may be all formed on one surface of the housing 100.

The vacuum transfer system 10 according to an embodiment of the present disclosure may further include a sensor 160 to display the internal state of the housing 100. For example, the sensor 160 may be an oxygen concentration sensor to measure the oxygen concentration inside the housing 100 and a relative humidity sensor to measure the relative humidity inside the housing 100. Additionally, the vacuum transfer system 10 may further include a box 170 to receive the sensor 160.

As shown in FIG. 3, the front surface 105 of the housing 100 may further include the box 170 to receive the sensor 160, and as shown in FIG. 4, the sensor 160 may be received in the box 170 to measure the internal state of the housing 100 and display the measured state of the internal space of the housing 100 in real time. Through the sensor 160, a change in the gas properties within the internal space of the housing 100 and its extent may be detected in real time.

Additionally, the vacuum transfer system 10 according to an embodiment of the present disclosure may further include a closed cable passage 180 through which cables necessary to operate the microscope 20 pass. Due to the structure of the microscope 20, the closed cable passage 180 through which the cables disposed within the housing 100 go out of the housing 100 may be further formed in one surface of the housing 100. The closed cable passage 180 may be configured to allow only the cable to pass therethrough to keep the housing 100 closed from the outside. As shown in FIGS. 2 to 4, the closed cable passage 180 may be formed in the first side surface 104 of the housing 100, and the operation cable of the microscope 20 shown in FIG. 1 may run to the outside through the closed cable passage 180. The location of the closed cable passage 180 of FIGS. 2 to 4 is provided by way of illustration and is not limited thereto.

Through the vacuum transfer system according to an embodiment of the present disclosure, it is possible to create a sample measurement environment free of an active gas such as oxygen, and prevent a sample to be measured for the nano indenter from rapidly reacting with moisture and oxygen when exposed to air. Accordingly, it is possible to accurately analyze air sensitive samples such as electrode and electrolyte material surfaces and their interfaces in lithium secondary batteries, thereby supporting the development and performance improvement of electrode and electrolyte materials of the lithium secondary batteries.

Hereinafter, a sample measurement method using the vacuum transfer system according to an embodiment of the present disclosure will be described.

Figure 5:
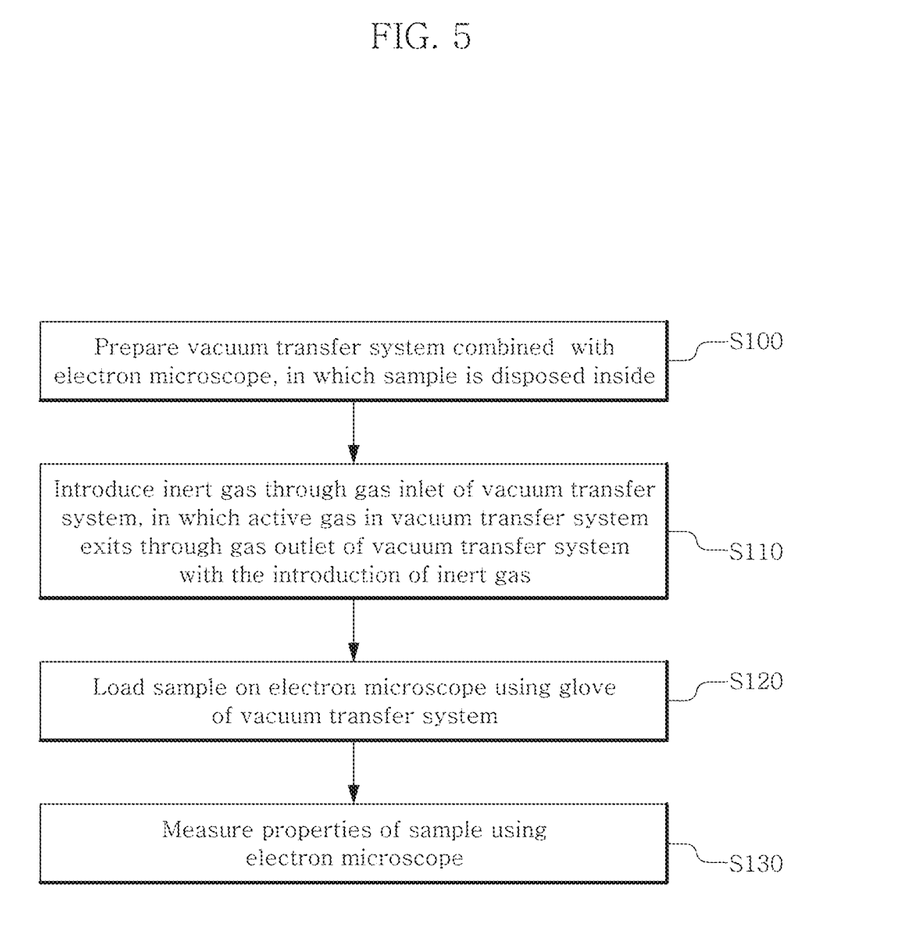
FIG. 5 is a flowchart of a sample measurement method using a vacuum transfer system according to an embodiment of the present disclosure.
Figure 6:
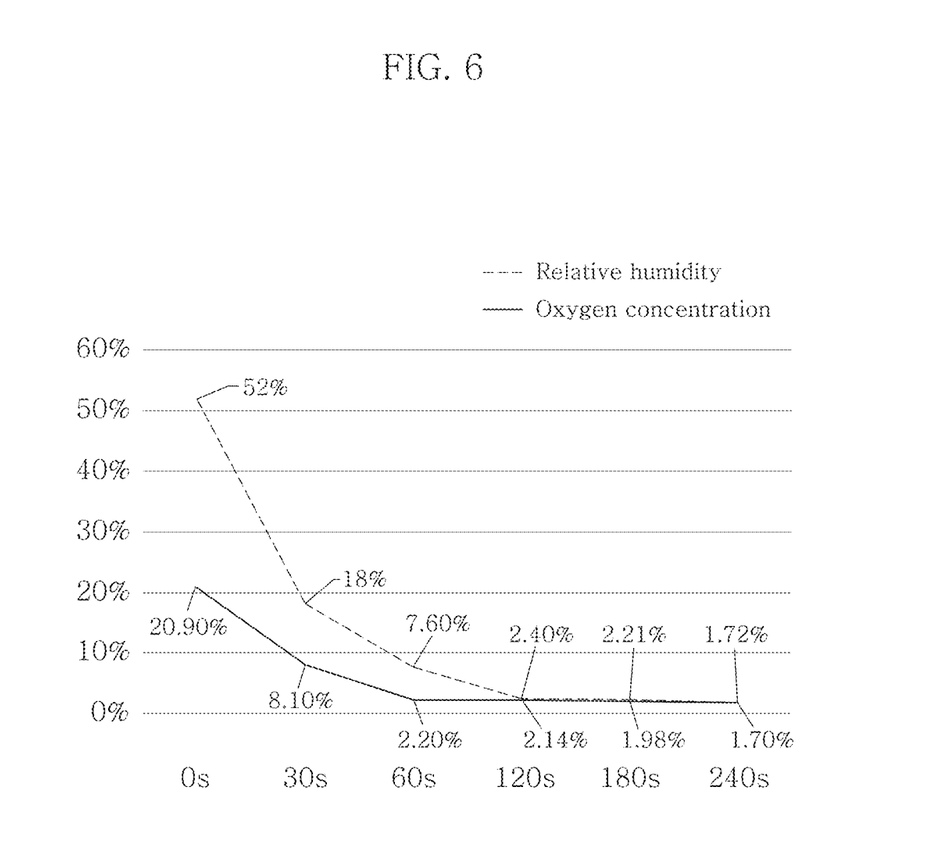
FIG. 6 is a graph showing changes in relative humidity and oxygen concentration measured after the operation of a vacuum transfer system.

FIG. 5 is a flowchart of the sample measurement method using the vacuum transfer system according to an embodiment of the present disclosure. FIG. 6 is a graph showing changes in relative humidity and oxygen concentration measured after the operation of the vacuum transfer system.

Referring to FIG. 5, the sample measurement method using the vacuum transfer system according to an embodiment of the present disclosure is a sample measurement method using the vacuum transfer system 10 according to the above-described embodiment installed in an microscope to prevent oxidation of a sample, and for description of this embodiment, reference may be made to FIGS. 1 to 4 and their corresponding description.

In detail, the sample measurement method using the vacuum transfer system according to an embodiment of the present disclosure includes preparing the vacuum transfer system combined with the microscope, in which a sample is disposed inside (S100); introducing an inert gas through the gas inlet of the vacuum transfer system, in which an active gas in the vacuum transfer system exits through the gas outlet of the vacuum transfer system with the introduction of the inert gas (S110); loading the sample on the microscope using the glove of the vacuum transfer system (S120); and measuring the properties of the sample using the microscope (S130).

To begin with, the vacuum transfer system combined with the microscope, in which a sample is disposed inside is prepared (S100).

The vacuum transfer system 10 combined with the microscope 20, in which the sample to be measured is disposed inside is prepared. Here, this step S100 may include coupling the vacuum transfer system 10 with the microscope 20 and putting the sample inside through the sample entry door 150 of the vacuum transfer system 10. The vacuum transfer system 10 and the microscope 20 may be combined through the coupling element 140 of the vacuum transfer system 10, and after combined, the sample may be put into the combined vacuum transfer system 10 through the sample entry door 150. However, the present disclosure is not limited thereto, and in some embodiments, the sample may be disposed in the vacuum transfer system 10, and then the microscope 20 may be combined with the vacuum transfer system 10 in which the sample is disposed inside. When the vacuum transfer system 10 is combined with the microscope 20 through the coupling element 140, the inside of the vacuum transfer system 10 is kept closed from the outside. Additionally, the sample disposed in the vacuum transfer system 10 is sealed into a vacuum state, and is in a noncontact state with the external air.

Subsequently, an inert gas is introduced through the gas inlet of the vacuum transfer system (S110).

The inert gas is introduced through the gas inlet 110 of the vacuum transfer system 10, and with the introduction of the inert gas, an active gas in the vacuum transfer system 10 exits through the gas outlet 120 of the vacuum transfer system.

Here, this step S110 may include detecting a change in state after the introduction of the inert gas through the sensor which displays the internal state of the vacuum transfer system, and introducing the inert gas until the internal state corresponds to a reference state. Here, as the inert gas is introduced and the active gas (oxygen) exits, there are changes in relative humidity and oxygen concentration inside the vacuum transfer system. For example, the reference state may refer to a state having the relative humidity of 2%. That is, the inert gas may be introduced until the relative humidity inside the vacuum transfer system 10 reaches 2%.

Referring to FIG. 6, it can be seen that as the vacuum transfer system 10 operates, i.e., the inert gas (Ar) is injected and the active gas exits, there are reductions in relative humidity and oxygen concentration inside the vacuum transfer system 10 (where the sample is loaded on the microscope 20). In particular, when the vacuum transfer system 10 operates for 4 minutes, it can be seen that eventually, the humidity inside the vacuum transfer system 10 reduces to 1.72%. In general, an environment having the relative humidity of 5% or less is required for sample analysis. Additionally, in general, the humidity inside vacuum packaging machine used to manufacture vacuum packaged samples is set to about 2%, and the relative humidity of glove boxes used to perform experiments in laboratories is set to the latter part of 2%. In view of this fact, the vacuum transfer system 10 according to the present disclosure may provide a more suitable measurement environment for analysis of air sensitive materials than vacuum packaging machine, glove boxes and the common measurement conditions.

Subsequently, the sample is loaded on the microscope using the glove of the vacuum transfer system (S120).

When the vacuum transfer system 10 is in a vacuum state in which the active gas is replaced with the inert gas, the sample may be unsealed, and the unsealed sample may be loaded on the microscope. That is, this step S120 may include unsealing the sample using the glove of the vacuum transfer system; and loading the unsealed sample on the microscope.

Here, to unseal the sample and load the sample on the microscope, at least one glove 130 configured to be connected to the inside of the vacuum transfer system 10 may be used. When the operator wears the glove 130, the operator may put his/her hand and arm into the vacuum transfer system 10. The operator may unseal the sample and load the sample on the microscope while the vacuum transfer system 10 is kept in the vacuum state.

Subsequently, the properties of the sample are measured using the microscope (S130).

The microscope 20 may include a nano indenter for nano indentation, and the properties of the loaded sample such as hardness and elastic modulus may be measured. Here, while the vacuum state is maintained through the vacuum transfer system 10, the sample may be loaded and the properties may be measured. That is, since the properties of the sample may be measured in a state in which reactions with active gas (oxygen) are prevented, it is possible to accurately measure the properties of highly oxidative samples such as interfaces between electrode and electrolyte materials applied to lithium secondary batteries.

Figure 7:
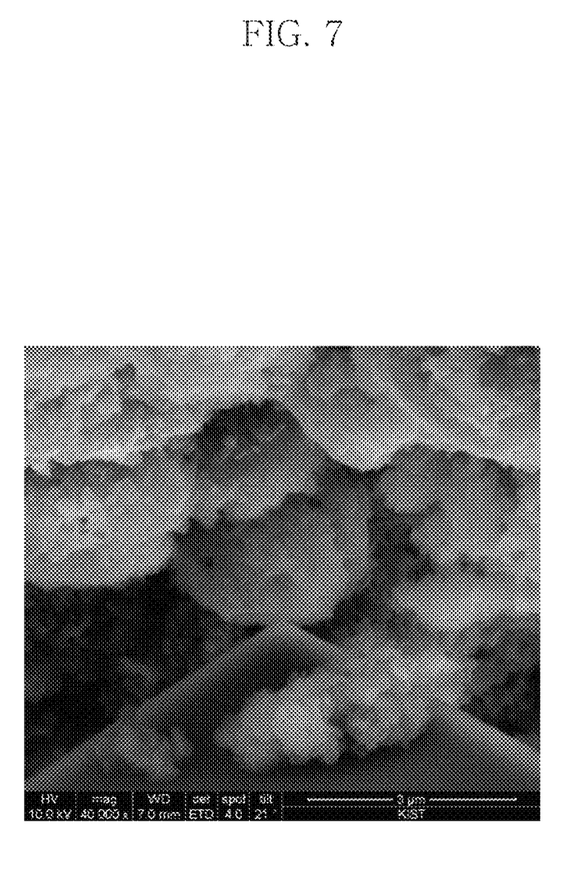
FIG. 7 is a scanning electron microscopy (SEM) image of silicon oxide captured when exposed in air.
Figure 8:
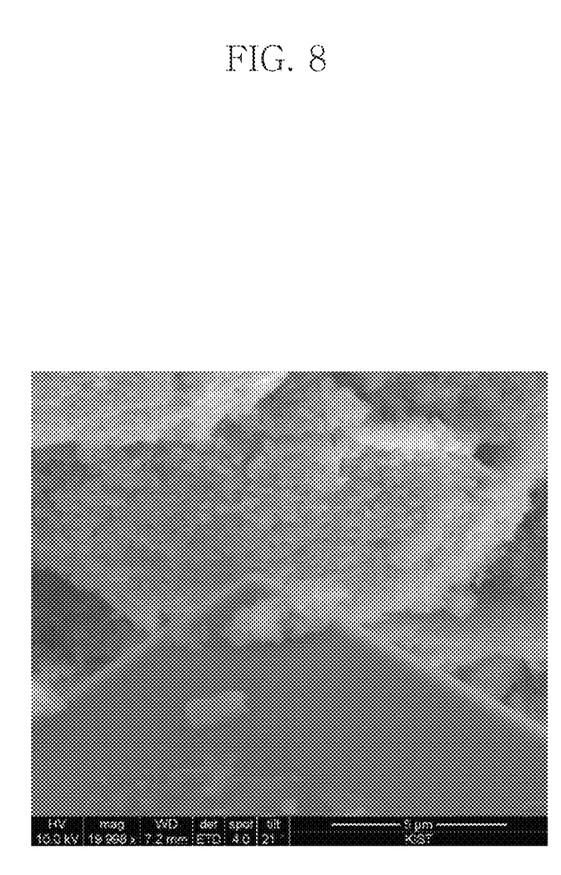
FIG. 8 is a SEM image of silicon oxide captured after applying a vacuum transfer system according to an embodiment of the present disclosure.

FIG. 7 is a scanning electron microscopy (SEM) image of silicon oxide captured when exposed in air. FIG. 8 is a SEM image of silicon oxide captured after applying the vacuum transfer system according to an embodiment of the present disclosure. Additionally, the following Table 1 is properties data of silicon oxide measured when exposed to air, and the following Table 2 is properties data of silicon oxide measured when the vacuum transfer system according to an embodiment of the present disclosure is applied.

TABLE 1

|  | Contact Depth (nm) | Modulus (GPa) | Hardness (Gpa) |
|---|---|---|---|
| Mean | 287.24 | 12.81 | 0.4472 |
| Std Dev | 75.64 | 3.30 | 0.1853 |

TABLE 2

|  | Contact Depth (nm) | Modulus (GPa) | Hardness (Gpa) |
|---|---|---|---|
| Mean | 236.16 | 14.51 | 0.5352 |
| Std Dev | 14.97 | 1.58 | 0.0460 |

When comparing FIG. 7 with FIG. 8 and Table 1 with Table 2 respectively, data analyzed with exposure to air reveals the development of oxidation caused by exposure to air. Additionally, in the case of hardness and elastic modulus of the sample, the state measured after applying the vacuum transfer system 10 is found higher than the state measured when exposed to air. The degradation in the inherent properties of the sample due to the oxidation of the sample occurring when exposed to air may be prevented through the vacuum transfer system 10 of the present disclosure. The vacuum transfer system 10 according to an embodiment of the present disclosure may prevent oxidation that may occur when loading and measuring the air sensitive sample, thereby supporting the measurement of the inherent properties of the sample.

While particular embodiments of the present disclosure have been described in detail, it is obvious that a variety of modifications may be made thereto without departing from the scope of technical spirit contained in a variety of embodiments. Therefore, the scope of the present disclosure should not be limited to the described embodiments and should be defined by the appended claims and their equivalents.

What is claimed is:

1. A vacuum transfer system installed in an microscope to prevent oxidation of a sample, the vacuum transfer system comprising:
a housing having an open surface, wherein the surface comprises a coupling element for attaching or detaching to/from the microscope, and an inside of the housing is kept closed from outside as the housing is coupled with the microscope through the coupling element;
a gas inlet through which an inert gas is introduced into the housing;
a gas outlet through which an active gas in the housing exits with the introduction of the inert gas into the housing; and
at least one glove formed to be connected with the inside of the housing.

2. The vacuum transfer system according to claim 1, wherein the gas inlet is disposed in a first side surface of the housing, and
the gas outlet is disposed in a second side surface of the housing opposite the first side surface of the housing.

3. The vacuum transfer system according to claim 2, wherein a plurality of gloves is formed, and
the gloves include a first glove disposed in the first side surface and a second glove disposed in the second side surface.

4. The vacuum transfer system according to claim 3, wherein the housing includes a top surface connecting the first side surface to the second side surface, and the glove further includes a third glove disposed in the top surface.

5. The vacuum transfer system according to claim 1, wherein the housing further includes a sample entry door formed in the housing to put the sample into the housing when the housing is coupled to the microscope.

6. The vacuum transfer system according to claim 1, further comprising:
a sensor disposed in the housing to display an internal state of the housing and a sensor box to receive the sensor,
wherein the sensor includes an oxygen concentration sensor to measure an oxygen concentration inside the housing and a relative humidity sensor to measure a relative humidity inside the housing.

7. The vacuum transfer system according to claim 1, wherein coupling element is a flexible rubber magnet, and is configured to further include a sealing element for maintaining a vacuum state.

8. A sample measurement method using a vacuum transfer system installed in an microscope to prevent oxidation of a sample, the sample measurement method comprising:
preparing the vacuum transfer system combined with the microscope, in which the sample is disposed inside;
introducing an inert gas through a gas inlet of the vacuum transfer system, in which an active gas in the vacuum transfer system exits through a gas outlet of the vacuum transfer system with the introduction of the inert gas;
loading the sample on the microscope using a glove of the vacuum transfer system; and
measuring properties of the sample using the microscope.

9. The sample measurement method according to claim 8, wherein preparing the vacuum transfer system comprises:
coupling the vacuum transfer system with the microscope; and
putting the sample inside through a sample entry door of the vacuum transfer system.

10. The sample measurement method according to claim 9,
wherein the vacuum transfer system comprises a coupling element for attaching or detaching to/from the microscope on an open surface,
wherein coupling element is a flexible rubber magnet, and is configured to further include a sealing element for maintaining a vacuum state,
wherein in the step of the coupling the vacuum transfer system with the microscope, the vacuum transfer system is coupled to the microscope via the coupling member.

11. The sample measurement method according to claim 8,
wherein introducing the inert gas through the gas inlet of the vacuum transfer system comprises:
detecting a change in state after the introduction of the inert gas through the sensor which displays an internal state of the vacuum transfer system, and
introducing the inert gas until the internal state corresponds to a reference state.

12. The sample measurement method according to claim 8,
wherein the sample is sealed into a vacuum state, and loading the sample on the microscope using the glove of the vacuum transfer system comprises:
unsealing the sample using the glove of the vacuum transfer system; and
loading the unsealed sample on the microscope.

13. The sample measurement method according to claim 8, wherein the introducing an inert gas through a gas inlet of the vacuum transfer system is performed for 4 minutes, and according to the step, the relative humidity of the vacuum transfer system is reduced to 1.72%.

* * * * *